Nov. 5, 1940.  T. SLACK  2,220,552
LAWN EDGER
Filed Nov. 1, 1938  2 Sheets-Sheet 2
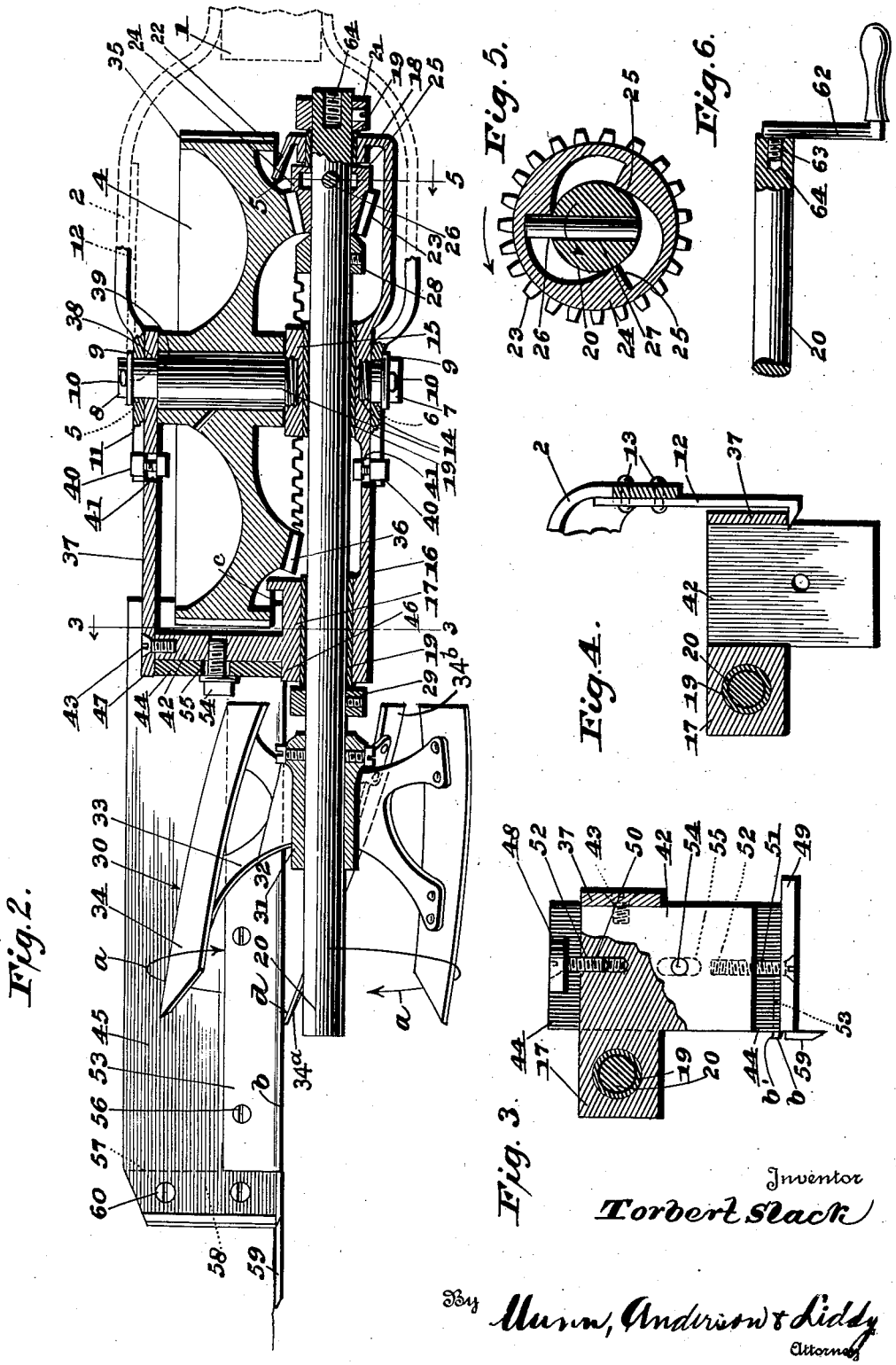
Inventor
Torbert Slack
By Munn, Anderson & Liddy
Attorneys Patented Nov. 5, 1940

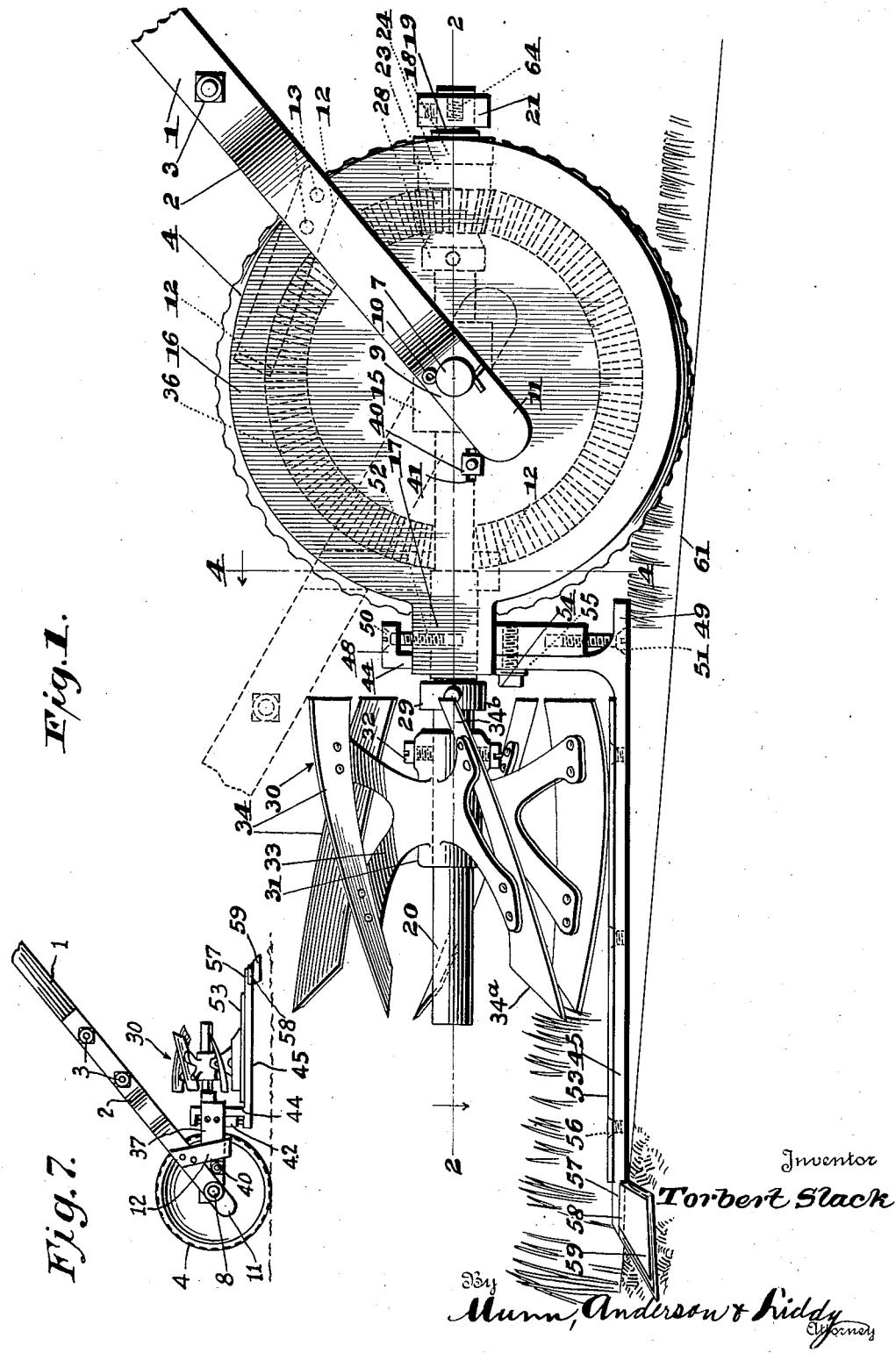

2,220,552

UNITED STATES PATENT OFFICE 2,220,552

LAWN EDGER

Torbert Slack, Lake Charles, La.

Application November 1, 1938, Serial No. 238,274

12 Claims. (Cl. 56—252)

This invention relates to an improved grass cutting appliance, but more particularly to a machine for cutting the edge of a lawn where it meets a walk. Machines of this type comprise, roughly speaking, a half of a conventional type of lawn mower, but the problem of providing an effective edger involves considerably more than merely utilizing one of the wheels, and a reduced size of cutting reel.

Such factors as providing a balanced machine, embodying a reel and cutter bar construction which is not likely to choke and stall, facilitating the reaching of the overhanging grass, etc. have to be taken into careful account in building a machine which will be satisfactory in every respect. These factors, and others of equal importance, have been identified with the improved invention, the objects of which are as follow:

First, to provide a garden tool which is used for the purpose of cutting grass along the edges of concrete and other walks and along curbs, being operated longitudinally of such walks, etc., so that grass which has grown over their surface edges may be picked up and sheared off, thus leaving a straight, neat line of lawn in contact with the concrete edges.

Second, to provide a lawn edger which is equipped with a combined replaceable slide plate and guide point for the respective purposes of making front contact with the walk and of both lifting the out-growing grass and cutting the turf, said plate and guide point being attachable beneath the foot-bar to prevent wearing the latter.

Third, to provide a lawn edger in which the blades of the reel are so set as to cut from front to rear in respect to the direction of motion of the tool, thereby constantly laying the cuttings down beside and behind the shear point, thus preventing throwing the cuttings forwardly and clogging the reel.

Fourth, to offset the reel shaft outside of the cutting line of the relatively stationary cutter bar in order to place the cutting edges of said bar and the blades in better relationship to the grass than if the reel were centered over the line of cut.

Fifth, to provide for a bevel cut of the grass and sod by arranging the back end of the foot-bar higher than the front end when the edger is placed on the walk and tilted over toward the lawn.

Sixth, to embody a novel structural arrangement in the lawn edger according to which the traction wheel is placed on the substantial center line of the foot-bar so that the machine will balance, the important result, however, of this arrangement being the spacing of the inside edge of the wheel away from both the cutting edge of the bar and the margin of the turf, thus affording ample traction without running the wheel off of the walk and facilitating holding the guide point against the walk.

Seventh, to provide a convertible lawn edger wherein the cutting reel is so mounted as to permit its ready removal from its shaft, the guide point then being used as a plow to loosen the marginal earth and turf preparatory to cutting upon a subsequent replacement of the reel.

Eighth, to provide a lawn edger with a replaceable cutting edge which can be kept in adjustment with the reel so that the shear point can be kept in correct contact with the reel blades.

Ninth, to provide a lawn edger the cutting assemblage of which (including the cutter reel, cutter bar, foot bar, guide point, etc.) swings free of the traction wheel, enabling the operator to place as much downward pressure on said wheel as is desired in order to propel the tool, this facility resulting in defending said assemblage from any extra friction, and all of this being due to the fork of the handle being journaled to the axle of the traction wheel which also supports the assemblage.

Other objects and advantages will appear in the following specification, reference being had to the accompanying drawings, in which:

Figure 1 is a side elevation of the improved lawn edger, showing how it appears when viewed from the lawn side.

Figure 2 is a partially elevational and sectional view taken substantially on the line 2—2 of Fig. 1.

Figure 3 is a cross section taken on the line 3—3 of Fig. 2.

Figure 4 is a cross section taken on the line 4—4 of Fig. 1.

Figure 5 is a cross section taken on the line 5—5 of Fig. 2.

Figure 6 is a detail view illustrating the use of a screw crank for turning the reel shaft when desiring to sharpen the cutter blades.

Figure 7 is an elevation of the other side of the lawn edger in Fig. 1, illustrating the use of the clip in transporting the cutting assemblage.

In carrying out the invention provision is made of a handle 1 which may be of the familiar type. This handle has a pair of flared metal straps 2 secured to it at 3. These straps constitute a fork (Fig. 2) to which end they straddle the drive wheel 4 and are provided with registering holes 5, 6, for the reception of axles 7, 8. A washer 9 is emplaced on each of the axles, whereupon a cotter pin 10 or the like is inserted in a hole through the axle to keep the respective washer in place. Each strap 2 projects at 11 beyond the axis which the axles 6, 7 represent for the purpose of engaging stops.

A spring clip 12 consisting of a resilient strip (Figs. 1 and 4) is riveted at 13 to the strap 2 at the right of the machine (looking forwardly). This clip is used in lifting the front of the machine for its transportation to and from the work. Said clip has a lug terminal (Fig. 4) which will be caught under the edge of the bar 37, and the handle 1 is swung far enough forward over the tool to accomplish this. The inner ends of the axles 7, 8 are threaded at 14 (Fig. 2) for screwing into the central bearing 15 of a side housing 16. Any other mode of attachment may be employed, for example the axles may be pressed in.

This housing is in the nature of a cover plate appearing on the left side of the machine, and it constitutes the chief element of a framework. It carries front and rear bearings 17, 18, which are in line with the central bearing 15. Each of these bearings is bushed at 19, and the main or reel shaft 20 is journaled in these bushings (Fig. 2).

Reading from right to left in Fig. 2, which is equivalent to reading from back to front of the machine, the reel shaft 20 has a collar 21 secured to it by a set screw. This collar appears on the outside of the housing 16, adjacent to that portion 22 thereof which is directed inwardly and forwardly to provide a guard for the pinion 23 on the inside of the housing. This pinion is of a more or less conventional style excepting that it has bevel teeth instead of the customary spur teeth.

The pinion 23 is mounted loosely on the shaft 20. It has a hub 24 which is made internally with a series of ratchet teeth 25 (Fig. 5). A slip pin 26, loosely mounted in a transverse hole 27 in the shaft 20 coacts with these teeth to impart a driving action to the shaft when the edger is impelled forwardly and a slip action when the edger is moved backwardly.

A collar 28 is set on the shaft 20 in position against the pinion 23 to assist the pin 26 in holding said pinion in position. A collar 29 is set on the shaft 20 at the front, the collars 21 and 29 being intended to prevent appreciable end play of the shaft. The reel 30 to the structure of which considerable importance is attached, is carried by the front end of the shaft 20.

This reel comprises a hub 31 which is provided with one or more set screws 32 with which to adjustably secure the reel on the shaft. It is to be noted that the front end of the shaft 20 constitutes a fairly long projection. This projection is longer than the size of the hub 31 would ordinarily appear to warrant. The purpose of the extra length of the shaft 20 is to enable setting the hub 31 and consequently the reel 30 in any one of a number of positions on the projecting end of the shaft.

A spider 33 comprises part of the hub 31. This spider has the cutter blades 34 riveted to it (Fig. 1), the leading and trailing ends of which are designated 34a and 34b respectively, for the purpose of a later distinction. The drive wheel 4 is journaled on the axle 8. It has a fairly broad rim 35 which is herein shown corrugated. For ordinary purposes the corrugations provide sufficient traction, but in the event that this is found not to be so the rim can be supplemented with a tire of rubber of the desired consistency so as to secure a better grip on the surface of the concrete or similar walk along which the edger is adapted to be pushed. The wheel 4 has a large bevel gear 36 in mesh with the pinion 23. The turning of the drive wheel 4 thus causes the rotation of the reel 20, the direction of rotation being counterclockwise (arrows a, Fig. 2).

A brace bar 37 (Fig. 2) extends forwardly from the axle 8. The brace bar has a hole 38 to contain the respective end of the axle. Incidentally, it is to be observed that the main and projecting parts of the axle are of two diameters, this arrangement providing a shoulder at 39 which is abutted by the adjacent end of the brace. The latter fits between the drive wheel 4 and the adjacent strap 2 of the fork. Said brace bar and the side housing 16 carry stops 40 with which the projections 11 of the handle fork 2 are engageable (Fig. 1). These stops may be and preferably are in the nature of small bolts which are adjustable horizontally in slots 41 to raise or lower the stopping point of the handle and thus suit the height of the operator. Upon depressing the handle sufficiently far the resulting engagement of the projections 11 with the stops 40, and the ensuing lifting effort will raise the front end of the machine.

A bracket 42 extends laterally of and downwardly from the bearing 17 (Fig. 2). It is situated in front of the drive wheel 4 and it has the front end of the brace bar 37 secured to it by a screw 43 or some desired equivalent. The upstanding plate 44 of a foot-bar 45 faces and is in intimate contact with the front of the bracket 42. This plate is sequestered in a recess defined by said bracket and those portions 46 and 47 of the bearing 17 and brace bar 37 which project forwardly beyond the bracket 42 (Fig. 2). This arrangement prevents side motion of the plate 44 relatively to the bracket 42 and serves to keep the foot-bar 45 in a true line.

The upstanding plate 44 has a right angular lug 48 on top and a similar lug 49 on the bottom, the latter being an extension of the foot-bar 45 respecting which it constitutes a heel. Screws 50, 51 have their heads swivelled in countersunk openings in these lugs. The screws are driven into threaded holes 52 in the bracket 42 and by turning the two screws in the proper directions it becomes possible to adjust the foot-bar 45 up or down so as to always have the cutter bar 53 in proper cutting relationship to the blades 34. This adjustment is made by first loosening a set screw 54 which passes through a slot 55 in the plate 44 before being driven into the bracket 42.

The previously mentioned cutter bar 53 is secured to the foot-bar 45 by a number of screws 56. This arrangement permits the use of a hard steel bar and also permits of its replacement when exceptional wear occurs. Said cutter bar is considerably longer than the reel 30. In order to establish approximate dimensions the reel is substantially one-half the length of the cutter bar. This proportioning is important from the standpoint of effecting a material variation in the depth of cut as presently brought out.

A transverse rabbet 57 on the underside of the foot-bar 45 and at its forward extremity or toe (Figs. 1 and 2) provides a recess for the shank 58 of a right angular and downturned guide point 59. This guide point is sharpened on its three edges, and its purpose is to cut into the soil so as to produce a clean edge along the margin of the walk. A further purpose of said point, as its name implies, is to guide the edger along the walk so as to keep the reel 30 and cutter bar 53 in true relationship to the grass. The guide point also lifts the overhanging grass and directs it onto the cutter bar 53.

The previously mentioned shank 58 of the guide point 59 constitutes a slide plate. It is this plate that contacts the surface of the walk. It is preferably made of hardened steel so as to resist wear, but it is secured in the rabbet by screws 60 which are removable to enable the replacement of the slide plate when excessive wear occurs.

In this connection it is to be observed that the edger has only two points of contact with the walk 61, the first being the drive wheel 4, the second being the slide plate 58. This arrangement places the foot-bar 45 on an incline in respect to the walk, the toe touching but the heel remaining elevated. Inasmuch as the reel shaft 20 is parallel to the foot-bar 45 (Fig. 1) said shaft also stands at an incline in respect to the walk.

It is to be observed that the cutting edge $b$ (Fig. 2) of the cutter bar 53 having said edge projected over the edge of the foot-bar and turned up at $b'$ (Fig. 3), is not in a straight line with the adjacent edge $c$ of the drive wheel 4. The cutting edge $b$ is closer to the grass, thus making it possible to drive the traction wheel farther to the left toward the grass, and still have it remain on the walk. This movement of the wheel to the left helps to hold the guide point 59 against the walk edge and it is also of assistance in bevel cutting the grass edge, or cutting the grass away from the walk, so to speak.

In order to arrive at the latter accomplishment the edger is tilted toward the left. The resulting positioning of the cutter bar 53 and the approach of the reel 30 toward the grass not only causes cutting the grass, but doing the cutting at an angle with respect to the walk. When one looks down along the edge of the walk he will see that the grass has been cut back on a bevel, in other words relieved from the walk. Another effect of this tilting is to cause the guide point to cut a slightly wider V-shaped groove in the soil along the edge of the walk, not only producing a pleasing appearance, but enabling the rim of the wheel 4 to be run along the edge of the walk at the angle mentioned, thus giving said wheel traction along the edge of the walk.

By reason of the fact that the shaft 20 is not parallel to the ground line, it follows that neither the shaft nor the reel 30 are parallel to the direction of motion of the edger. The same applies to cutter bar 53 and to the foot-bar 45. These factors play an important part in the foregoing beveling of the grass. It is to be observed in Fig. 2 that the shaft 20 does not lie in a vertical plane with the cutting edge $b$ of the cutter bar 53. In other words, the shaft 20 is offset from said cutting edge, this arrangement producing a better shearing cut than if the reel were directly over the cutting edge $b$ and, what is more important, has an increased tendency toward the self sharpening of the blades 34.

The blades 34 are set at a pitch in respect to the longitudinal axis of the shaft 20 as is well seen in the instance of the blade $d$ (Fig. 2). This pitch is so directed that the leading ends 34a of the blades strike the cutter bar 53 first. This principle would obtain whether the reel is rotated clockwise as in the drawing when viewed from the front, or counterclockwise in the conceivable circumstance of the reel being made to operate on the other side of the foot-bar 45. In each case the arrangement causes the front to rear cutting progression upon which considerable emphasis is herein laid. This has the important effect of cutting the grass from front to back of the reel. In other words, when the cutting edge of the blade $d$ approaches the cutting edge $b$, the shear point will progress rearwardly along the cutter bar 53 as the machine advances forwardly, thus cutting the projecting grass off and throwing it over onto the walk as the machine advances. This is contrary to an ordinary shear cut wherein the cutting point advances from back to front. The result is that the blades of grass are cut and disposed of as the machine advances and there is no possibility of the reel 30 becoming choked or stalled because of a surplus amount of grass being crowded between the blades and the cutter bar.

The foregoing twist or set of the reel blades 34 plus the circular motion of the reel from right to left causes the tool to move forward with the least resistance when propelled. As each blade turns over and downward the forward tip of one blade strikes the cutter-bar 53, then as the operator pushes the tool the sod and grass immediately back of this blade press against it until the tip of the next blade meets the cutter bar and so on. This has the effect of helping the reel turn from right to left the way it is intended to go. This would not be the case if the blades were twisted from left to right which would cause cutting as with a pair of shears, and also require more effort in propelling.

Another important effect that the foregoing right to left twist of the blades has is the aiding in keeping the guide point 59 against the walk, because the right to left motion of the reel (arrows $a$, Fig. 2) is the same as the twist of the blades. In other words, the machine tends to veer to the right when propelled thus keeping the guide point against the walk.

With reference to the adjustability of the hub 31 (Fig. 2), the resulting settings of the reel 30 provide for high and low cuts. Now it must be apparent that the conspicuous shortness of the reel as compared with the cutter bar is an important factor because by having the reel substantially one-half the length of the inclined cutter bar there is room for enough adjustment to produce a wide variety in the depth of cut. When the reel is adjusted back on the projection of the shaft 20 (Fig. 1) it will produce a high and light cut. When it is adjusted to the forward extremity of the shaft, the cut will be low and heavy. The reel is easily removed for any purpose whatsoever, and one of said purposes would be to enable the operation of the edger with the guide point 59 alone, the latter then being used as a plow to loosen up soil and turf running over the edge of the walk. After this operation is completed the reel will be replaced and reset.

Attention is directed to Fig. 6 which illustrates a crank for use in sharpening the blades 34. The crank is designated 62 and it has a screw stem 63 with a right hand thread. This stem is adapted to be screwed into a similarly threaded bore 64 in the back end of the shaft 20. When it is desired to sharpen the blades 34 a small amount of cutting compound is smeared along the cutter bar 53. The crank 62 is then turned clockwise so as to sharpen the blades. In this operation the wheel 4 will be driven, for which reason it is necessary to support the edger in such a way that the rotation of the wheel 4 will not be obstructed.

I claim:

1. A lawn edger comprising a drive wheel adapted to traverse a walk adjacent to a lawn, a cutter reel and cutter bar situated in advance of said wheel, means to rotate the reel from the driving wheel, and a slide plate working in conjunction with the cutter bar, extending forwardly directly in front of said wheel to be slid along the surface of a walk next to the edge of the lawn, said plate having a right angularly positioned guide point substantially in line with the cutting edge of the cutter bar to cut the earth and contact the edge of the walk to insure straight line cutting, said guide point and slide plate acting to pick up grass overhanging said edge and directed onto the cutter bar.

2. A lawn edger comprising a rotatable drive wheel and cutter reel, a foot-bar situated in advance of said wheel, a slide plate which is a substantial right angle laterally of the foot-bar thus providing a shank, normal to said foot-bar and an unrightly disposed guide point to be run along the edge of a walk, said guide point being adapted to approach the undersides of grass blades and lift them to the foot-bar, and means securing the shank of the slide plate beneath the foot-bar for contact with the walk, thus to prevent wearing the foot-bar.

3. A lawn edger comprising a drive wheel, a housing having an axle on which the drive wheel is journalled, a bracket included in said housing, a brace bar extending from the axle to the bracket and having a portion extending therebeyond, a shaft and means by which said shaft is driven from the wheel, means on the housing supporting the shaft including a bearing with a portion also extending beyond the bracket, a reel mounted on the shaft, and a foot-bar having a cutting edge with which the blades of the reel are coactible to produce a shear cut, said foot-bar having a plate backed against said bracket and having its sides in contact with said projecting portions, thereby being sequestered to maintain the foot-bar steadily in reference to the reel.

4. A lawn edger comprising a drive wheel, a housing having an axle on which the drive wheel is journalled, a bracket included in said housing, a brace bar extending from the axle to the bracket and having a portion extending therebeyond, a shaft and means by which said shaft is driven from the wheel, means on the housing supporting the shaft including a bearing with a portion also extending beyond the bracket, a reel mounted on the shaft, a foot-bar having a cutting edge with which the blades of the reel are coactible to produce a shear cut, said foot-bar having a plate backed against said bracket and having its sides in contact with said projecting portions, thereby being sequestered to maintain the foot-bar steady in reference to the reel, and means swivelly carried by portions of the plate and being in adjustable connection with said bracket for setting the foot-bar in reference to the reel.

5. A lawn edger comprising a housing having a central bearing, a pair of axles on diametrically opposite sides of said bearing, therefore being in axial alinement, one of said axles having a reduction in diameter providing a shoulder, a drive wheel journaled on one of said axles, a foot-bar carried by said housing and projecting therefrom directly in front of the drive wheel, a shaft and means by which it is driven from the wheel, said shaft having a cutter reel coacting with the foot-bar for cutting grass, a handle for impelling the lawn edger including a forked structure fitted upon both of said axles, and a brace bar secured at one end to a portion of said housing, its other end being fitted upon one of said axles between the shoulder and a portion of the fork.

6. A lawn edger comprising a housing, a series of axially alined bearings carried by the housing, one of said bearings being located intermediately of a pair of the bearings, an axle carried by the intermediate bearing, a drive wheel journaled on the axle, said drive wheel including a gear, a shaft journaled in the series of bearings and having a pinion loosely mounted thereon and in mesh with the gear, a slip pin and ratchet arrangement between the pinion and shaft producing uni-directional rotation of the shaft upon the movement of the drive wheel in one direction but resulting in an idling of the pinion on the movement of the drive wheel in the reverse direction, a cutter bar carried by the housing, and a bladed cutting reel carried by the shaft in cutting relationship to said bar.

7. In a lawn edger, a cutting assemblage comprising a bladed reel, a housing on which the reel has revoluble support, said housing including a bar, and a cutter bar with which the blades coact to cut grass; an axle carried by the housing, a drive wheel carried by the axle and in driving connection with the reel, said axle constituting a center from which the cutting assemblage is swingable for gravitation of the cutter bar against the ground, and means by which to sustain the cutting assemblage in a non-cutting position for transportation from place to place, said means comprising a handle having a fork and straps turnably attached to the axle for pushing, and a spring clip secured to one of the straps and consisting of a resilient strip having a lug terminal projecting clear of the housing bar but engageable therewith by swinging the handle in one direction, a reverse swinging of the handle lifting the assemblage from the ground.

8. A lawn edger comprising a revoluble drive wheel, a cutter bar situated in advance of said wheel and having a cutting edge, a reel shaft set at right angles to the axis of said drive wheel, means for driving said shaft from said drive wheel, reel blades secured to the shaft, the blades having leading and trailing ends, said blades having their leading ends advanced in the direction of rotation of the shaft so that the leading ends strike the cutter bar first and cause a cutting progression from front to rear of said cutting edge.

9. A lawn edger comprising a revoluble drive wheel adapted to be driven forwardly along a lawn edge to be trimmed, a foot-bar situated in advance of said wheel and having a cutting edge disposed longitudinally of the line of trimming, a reel shaft set at right angles to the axis of said drive wheel, means for driving said shaft from said drive wheel, reel blades secured to the shaft, the blades having leading and trailing ends, said blades having their leading ends advanced in the direction of rotation of the shaft so that the cutting point of each blade at the cutting edge progresses in a direction contrary to the direction of motion of the lawn edger.

10. A lawn edger comprising a drive wheel adapted to be run on a walk, a foot-bar stationed in advance of the drive wheel, said foot-bar having a toe and heel at the front and rear respectively being adapted to touch the surface of the walk and to stand elevated therefrom thereby setting the foot-bar on an incline in reference to the walk, a cutter bar attached to the foot-bar, a shaft parallel to the foot-bar and spaced thereabove, means by which the shaft is driven from said wheel, a cutter reel having blades substantially one-half the length of the cutter bar, said blades having leading and trailing ends, a hub carrying said blades being mounted on said shaft, and an adjusting screw carried by the hub to be driven against the shaft to adjust the reel along the shaft from a position wherein the leading ends substantially overlie the toe to a position wherein the trailing ends substantially overlie the heel.

11. A lawn edger comprising a drive wheel, a housing by which the drive wheel is carried and including a front bracket, a shaft revolubly carried by the housing and being driven by said wheel, a cutter reel on the forward end of the shaft, a foot-bar extending forwardly of the bracket at one side of the shaft and reel, an upstanding plate at the rear of the foot bar, and means projecting forwardly of the bracket defining with said bracket a recess in which the upstanding plate is sequestered to hold the foot-bar steady in its forwardly directed position.

12. A lawn edger comprising a housing adapted to be substantially upright with respect to a walk, an axle affixed at right angles to the housing, a drive wheel journaled on a part of the axle and adapted to run on the walk, a cutting assemblage extending forwardly from said axle, being located in advance of the drive wheel and including a cutting reel in driven connection with the drive wheel, a pusher handle having straps swingably attached to the substantial terminals of the axle, at least one of the straps having a projection beyond and below the axle thus to occupy a position below the axis of the cutting reel, and a stop mounted on the housing also being below the axis of the cutting reel and within the range of movement of said handle projection, providing for a turning of the housing and cated in advance of the drive wheel and in-wheel while resting on the walk by bearing down on the handle.

TORBERT SLACK.

CERTIFICATE OF CORRECTION.

Patent No. 2,220,552. November 5, 1940.

TORBERT SLACK.

It is hereby certified that error appears in the printed specification of the above numbered patent requiring correction as follows: Page 4, first column, line 24, claim 2, for "unrightly" read --uprightly--; page 5, second column, line 21, claim 12, strike out "cated in advance of the drive wheel and in-" and insert instead --cutting assemblage with respect to the drive--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.